United States Patent [19]
Chang et al.

[11] Patent Number: 5,758,212
[45] Date of Patent: May 26, 1998

[54] CAMERA FOR SHORTENING A STROBE CHARGE TIME

[75] Inventors: Seung-mun Chang; Tae-kyong Yun, both of Kyeongsangnam-do, Rep. of Korea

[73] Assignee: Samsung Aerospace Industries, Ltd., Kyeongsangnam-do, Rep. of Korea

[21] Appl. No.: 852,418

[22] Filed: May 8, 1997

Related U.S. Application Data

[63] Continuation of Ser. No. 493,311, Jun. 21, 1995, abandoned.

[30] Foreign Application Priority Data

Jul. 22, 1994 [KR] Rep. of Korea .................. 94-17756

[51] Int. Cl.$^6$ ..................................................... G03B 7/20
[52] U.S. Cl. ........................................... 396/205; 396/203
[58] Field of Search .................................. 396/201, 203, 396/205

[56] References Cited

U.S. PATENT DOCUMENTS

| | | | |
|---|---|---|---|
| 4,146,822 | 3/1979 | Eppe et al. | 315/241 R |
| 4,326,221 | 4/1982 | Mallos et al. | |
| 4,782,393 | 11/1988 | Kawamura | |
| 4,974,088 | 11/1990 | Sasaki | |
| 5,389,998 | 2/1995 | Dunsmore et al. | 354/484 |
| 5,430,518 | 7/1995 | Tabata et al. | 354/267.1 |

FOREIGN PATENT DOCUMENTS

| | | |
|---|---|---|
| 0 443 463 A1 | 8/1991 | European Pat. Off. |
| 883105 | 11/1961 | United Kingdom |
| 1 306 083 | 2/1973 | United Kingdom |
| 1 391 162 | 4/1975 | United Kingdom |

*Primary Examiner*—Daniel P. Malley
*Attorney, Agent, or Firm*—Finnegan, Henderson, Farabow, Garrett & Dunner, L.L.P.

[57] ABSTRACT

A camera for shortening a strobe charge time comprising the present invention discloses a camera and a method for shortening the charge time of a strobe by mounting a generator around or within a motor and applying electric energy produced from the turning of the motor to the strobe. The camera includes a switching circuit, an automatic distance measuring circuit, a brightness measuring circuit, a microcontroller, a motor driving circuit, a motor section, a generating circuit, a strobe charged by a charge signal produced from the microcontroller or by the electrical energy produced from the generating circuit, and a shutter driving circuit. The switching circuit includes a first step release switch, a second step release switch, a photographic mode switch, and a back-cover switch. The motor section includes one or more motor driven by a film winding signal or a film rewinding signal produced from the motor driving circuit, and the generating circuit likewise includes one or more generator. The strobe is charged by a charge signal produced from the microcontroller or by the electrical energy produced from the generating circuit.

4 Claims, 9 Drawing Sheets

CAMERA FOR SHORTENING A STROBE CHARGE TIME

This application is a continuation of application Ser. No. 08/493,311, filed Jun. 21, 1995, now abandoned.

BACKGROUND OF THE INVENTION

I. Field of the Invention

The present invention relates to a device and a method for controlling a strobe charge of a camera that may shorten a strobe charge time. More particularly, it relates to a camera and a method that may shorten a strobe charge time by mounting a generator around or within a motor and applying to the strobe the electric energy produced from the turning of the motor. This allows the generation of electric energy by means of one or more motors used in the camera.

II. Description of the Prior Art

The operation of a strobe charge of a conventional camera is as follows.

As shown in FIG. 1, a charge signal is applied from a microcontroller 30 to operate a charge circuit 52, and main condenser C1 is charged. FIG. 5 shows a timing diagram of the operation of a conventional camera.

When the charging of the main condenser C1 is finished and a signal corresponding to it is applied to the microcontroller 30, the microcontroller 30 determines if a release switch is turned ON or turned OFF in response to the photographing operation of a user.

If the release switch is turned ON by the user, the microcontroller 30 outputs a signal to a trigger circuit 53 to operate the strobe in response to the photographing operation. When the signal produced from the microcontroller 30 is applied to the trigger circuit 53, the trigger circuit 53 is activated, and the electric charge in the main condenser C1 is discharged through a Xenon lamp 54 so that the Xenon lamp 54 emits a light.

In a conventional technique, when the strobe is charged to flash, the main condenser C1 is charged with energy produced from a dry battery 51, and a charge time is set as a function of the dry battery 51.

In other words, since the current required for charging the strobe should be higher than that produced by the dry battery 51, a predetermined period of time must elapse before the strobe can be charged.

Since a conventional device for controlling the charging of a strobe relies only on the power applied from the dry battery 51, when a zooming switch is turned ON, when the film is transferred by one cut after photographing, or when the film is mounted first in a zoom camera, a three-comma movement of the film is performed simultaneously with the charging of the strobe. The current required for charging the strobe, however, is too large to perform the operation of the zooming switch or film winding as well. This creates the problem that charging of the strobe may be interrupted.

Since the strobe charge may be interrupted as mentioned above, it may take additional time to charge the strobe. This creates the problem that when photographing at an important moment, the strobe may not flash and a photograph having a suitable exposure may not be obtained.

SUMMARY OF THE INVENTION

It is an object of the present invention to overcome the problems and disadvantages of the prior art. In order to achieve the above objects, the camera for shortening a strobe charge time of the present invention, as embodied and broadly defined herein, comprises a strobe for illuminating light, an electrical motor, a generating circuit, coupled to the motor, for generating electrical energy whenever the motor is energized and means coupled to the strobe and the generating circuit, for charging the strobe with electrical energy generated from the generating circuit whenever necessary.

According to another aspect of the present invention, the camera for shortening a strobe charge time, as embodied therein, comprises a strobe for illuminating light, a first motor for controlling the winding of a film mounted in the camera, a second motor for controlling the movement of a lens system in the camera, a first generating circuit, coupled to the first motor, for generating electrical energy whenever the first motor is energized, a second generating circuit, coupled to the second motor, for generating electrical energy whenever the second motor is energized and means couple to the strobe and the first and second generating circuit for charging the strobe with electrical energy generated from either one of the first and second generating circuits whenever necessary.

According to yet another aspect of the present invention, the camera for shortening a strobe charge time, as embodied therein, comprises a strobe for illuminating light, a first motor for controlling the winding of a film mounted in the camera, a second motor for controlling the movement of a lens system in the camera, a first generating circuit, coupled to said first motor, for generating electrical energy whenever the first motor is energized a second generating circuit, coupled to the second motor, for generating electrical energy whenever the second motor is energized and means, couple to the strobe and the first and second generating circuits, for charging the strobe with electrical energy generated from both the first and second generating circuits whenever necessary.

Additional objects and advantages of the invention will be set forth in part in the description that follows and in part will be obvious from the description, or may be learned by practice of the invention. The objectives and advantages of the invention will be realized and attained by means of the elements and combinations particularly pointed out in the appended claims. The accompanying drawings, which are incorporated in and constitute a part of this specification, illustrate several embodiments of the invention and together with the description, serve to explain the principles of the invention.

DETAILED DESCRIPTION OF THE PREFERRED EMBODIMENTS

Reference will now be made in detail to the preferred embodiment of the invention, an example of which is illustrated in the accompanying drawings. Wherever possible, the same reference numbers will be used throughout the drawings to refer to the same or like parts.

Figure 2:
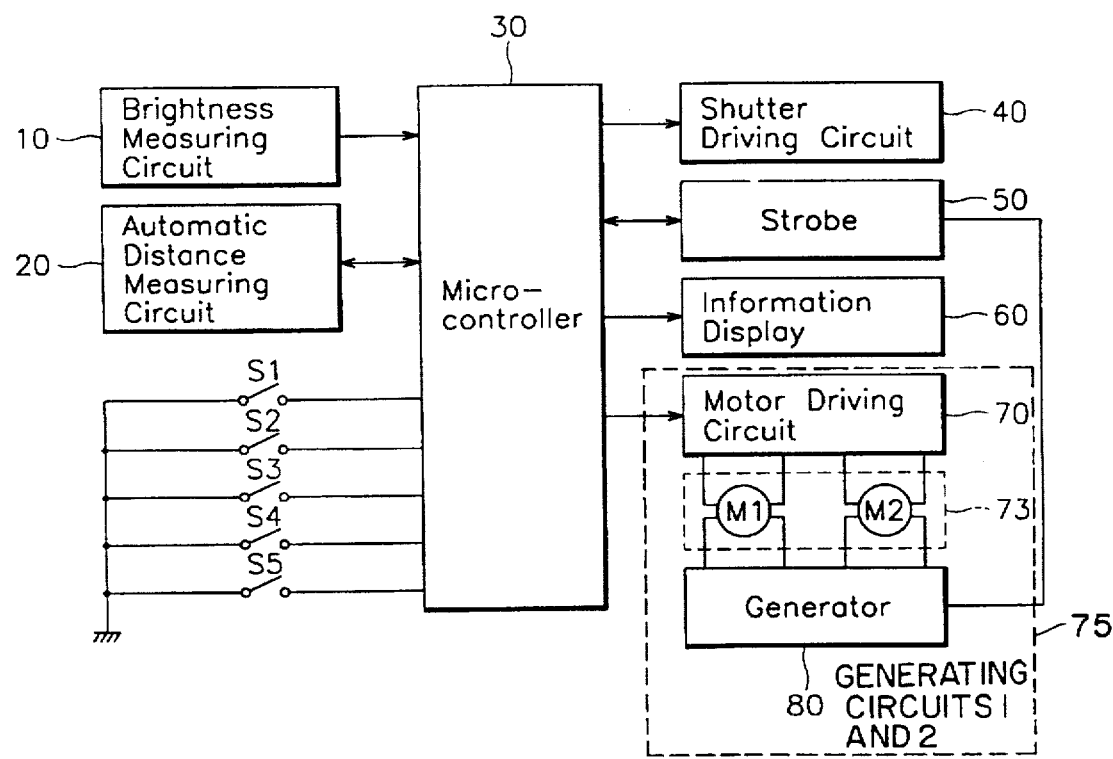
FIG. 2 is a schematic block diagram of a camera for shortening a strobe charge time in accordance with the first and second embodiments of the present invention.
Figure 3A:
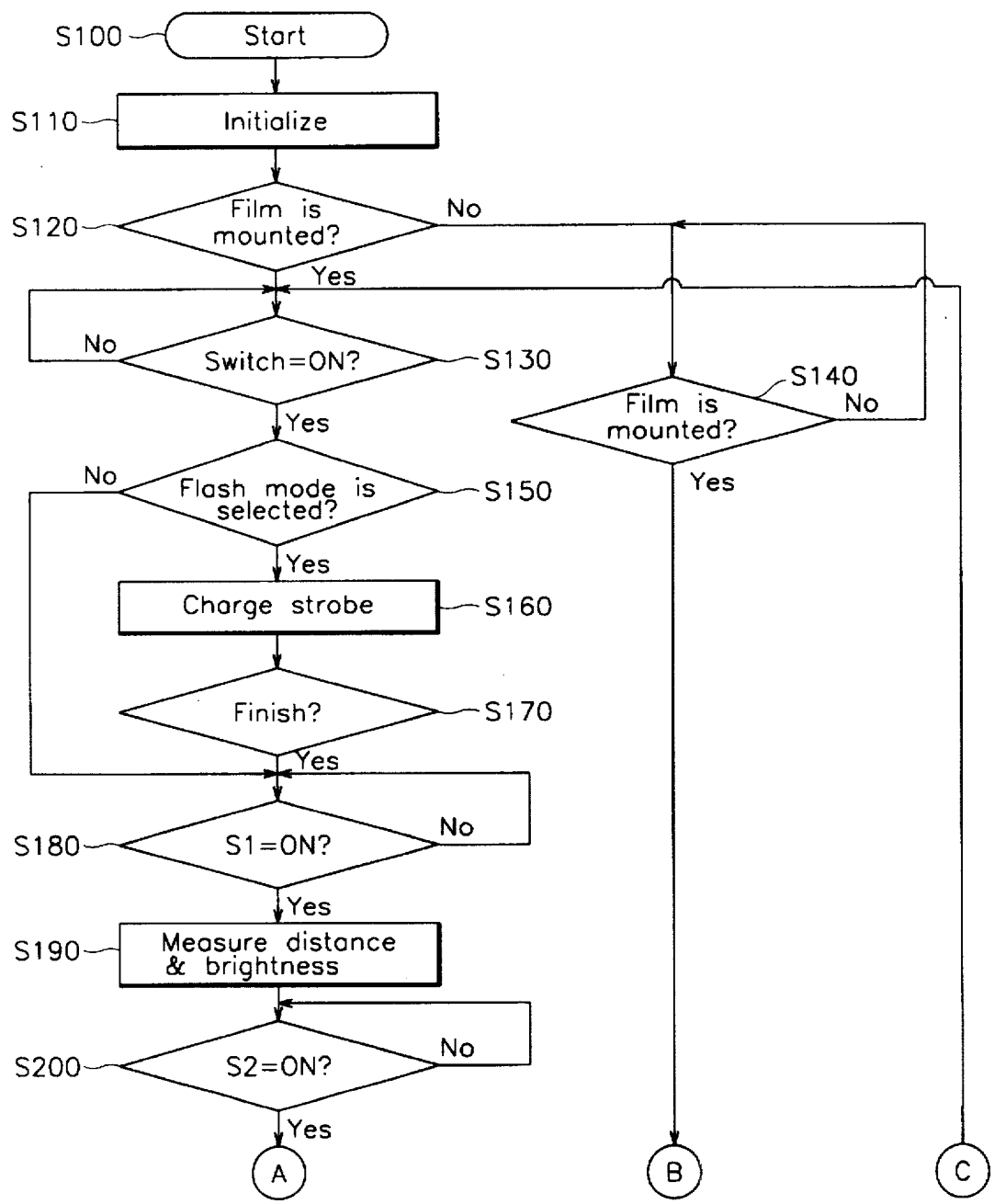
FIGS. 3A and 3B depict the steps in the operation for controlling a zoom camera to shorten a strobe charge time in accordance with the first preferred embodiment of the present invention.
Figure 3B:
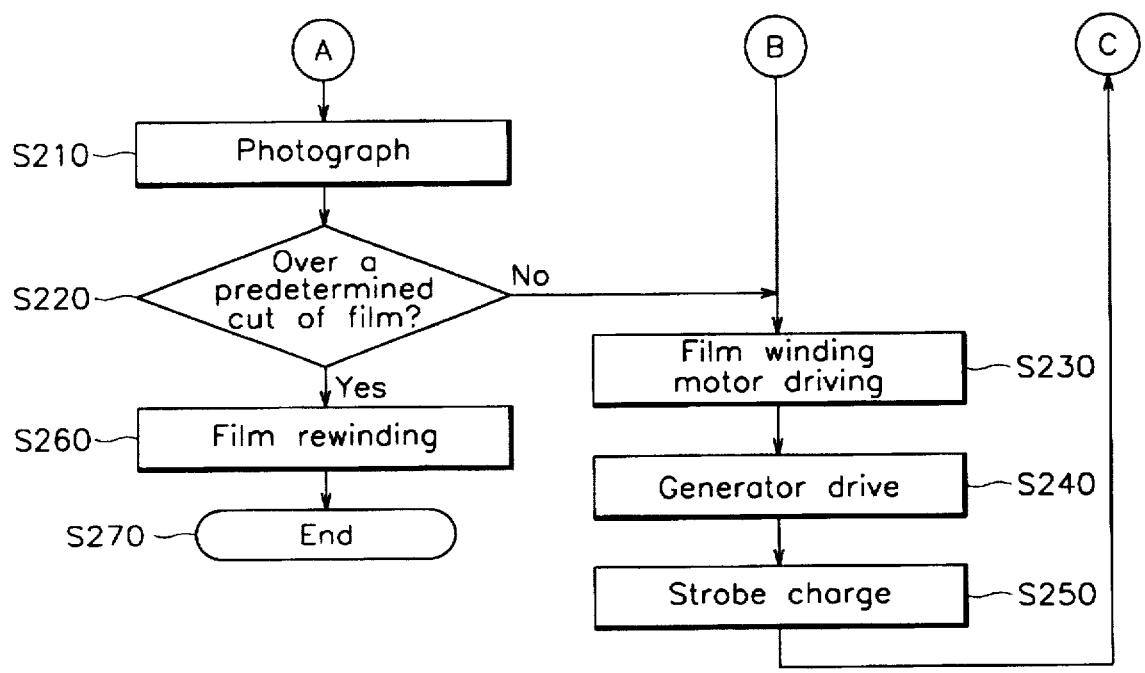
Figure 4A:
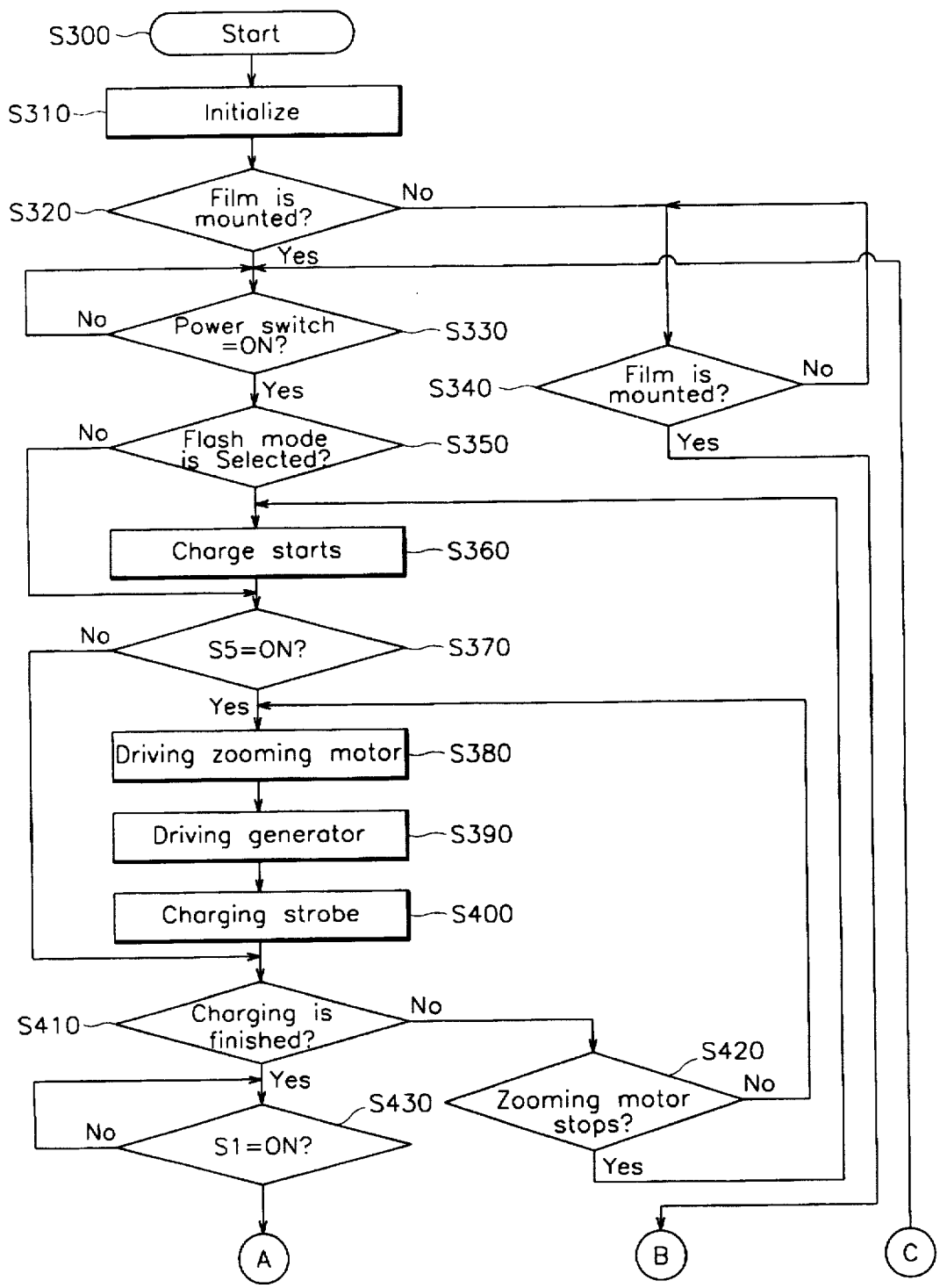
FIGS. 4A and 4B depict the steps in the operation for controlling a zoom camera that may shorten a strobe charge time in accordance with the second preferred embodiment of the present invention.
Figure 4B:
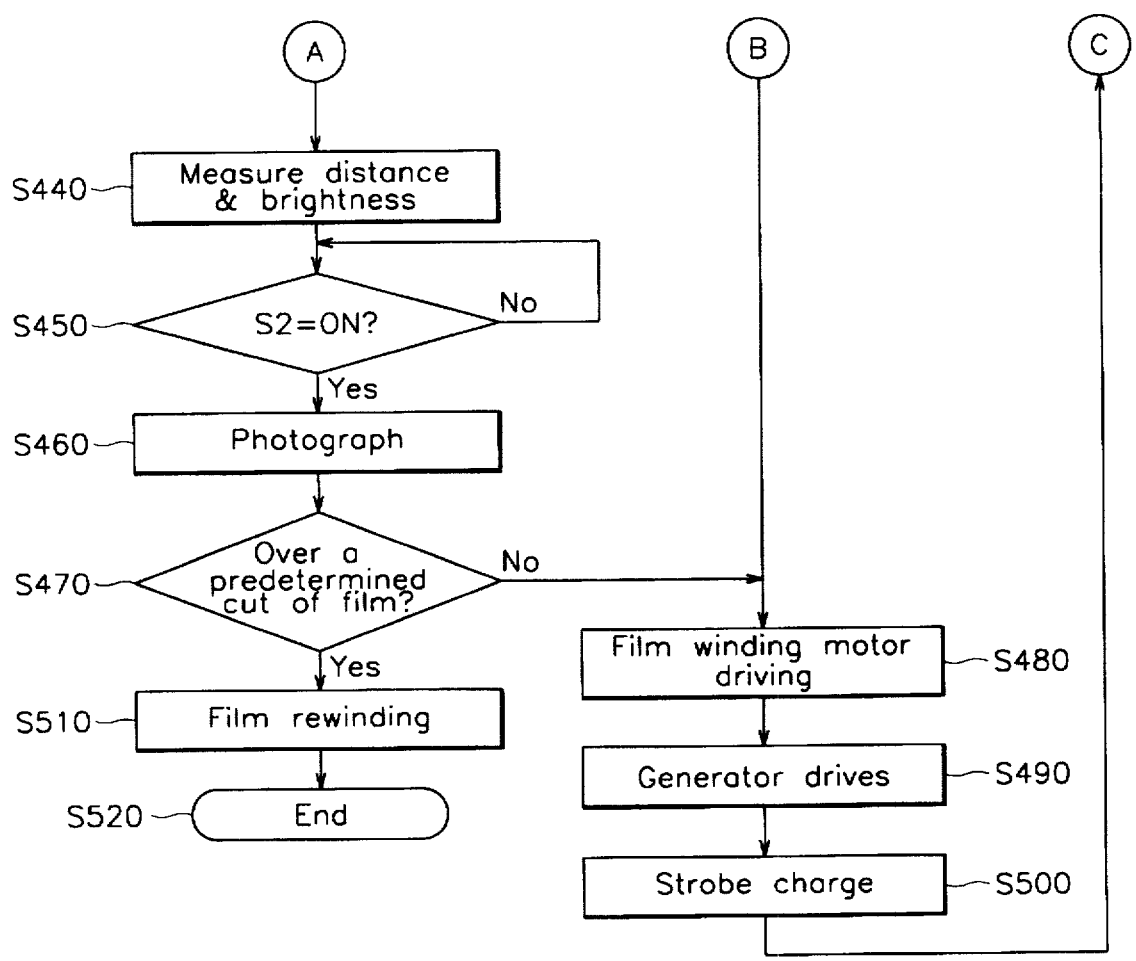
Figure 5:
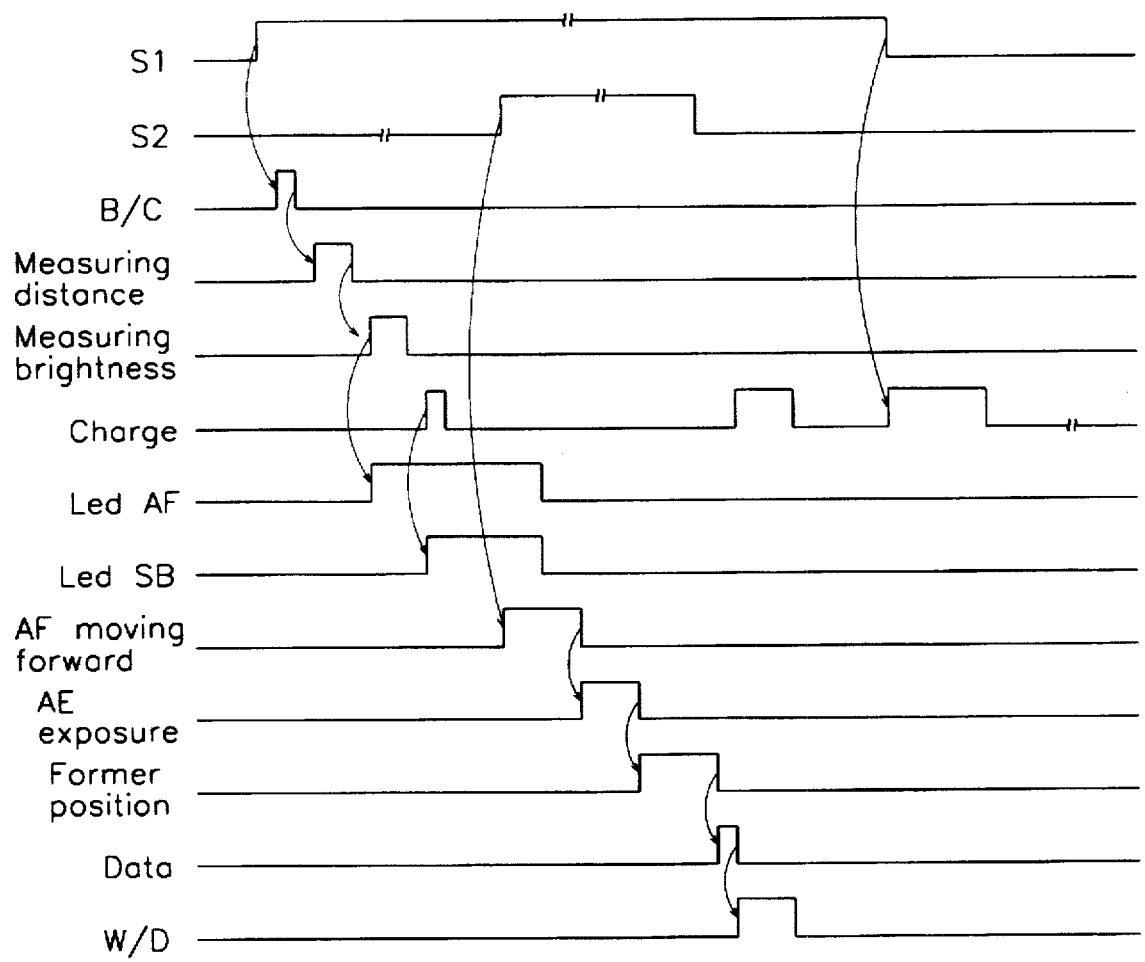
FIG. 5 is a timing diagram of the operation of a conventional camera.

FIG. 2 is a schematic block diagram of a camera that shortens the charge time of a strobe in accordance with first and second embodiments of the present invention. FIGS. 3A and 3B depicts the steps in the operation for controlling a zoom camera to shorten the strobe charge time in accordance with the first preferred embodiment of the present invention. FIGS. 4A and 4B depicts the steps in the operation for controlling a zoom camera to shorten the strobe charge time in accordance with the second preferred embodiment of the present invention.

In accordance with the first and second embodiments of the present invention, FIG. 2 shows a camera for shortening a strobe charge time. The camera comprises a brightness measuring circuit 10 for measuring an ambient brightness around the object, an automatic distance measuring circuit 20 for measuring a distance from an object to be photographed, a first step release switch S1, a second step release switch S2, a photographic mode switch S3, a back-cover switch S4, a zooming switch S5, a microcontroller 30 connected to output terminals of the brightness measuring circuit 10, the automatic distance measuring circuit 20 and switches S1 to S5 to output a signal in response to the photographing operation, a shutter driving circuit 40 photographing according to the signal produced from the microcontroller 30, a strobe 50, an information display 60 showing the camera state by the signal of the microcontroller 30, a motor driving circuit 70 connected to an output terminal of the microcontroller 30 for controlling the winding and rewinding film and the moving forward of the lens, motor means 73 including a film motor M1 and a zooming motor M2, and a generator 80 connected to an output terminal of the film motor M1.

Figure 1:
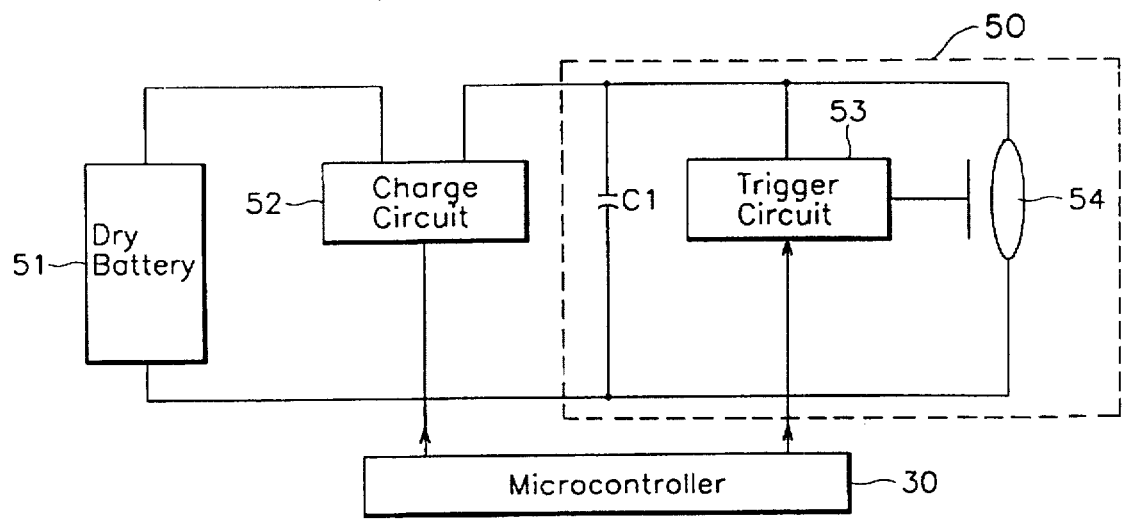
FIG. 1 is a circuit diagram of a strobe of a conventional camera.
Figure 2A:
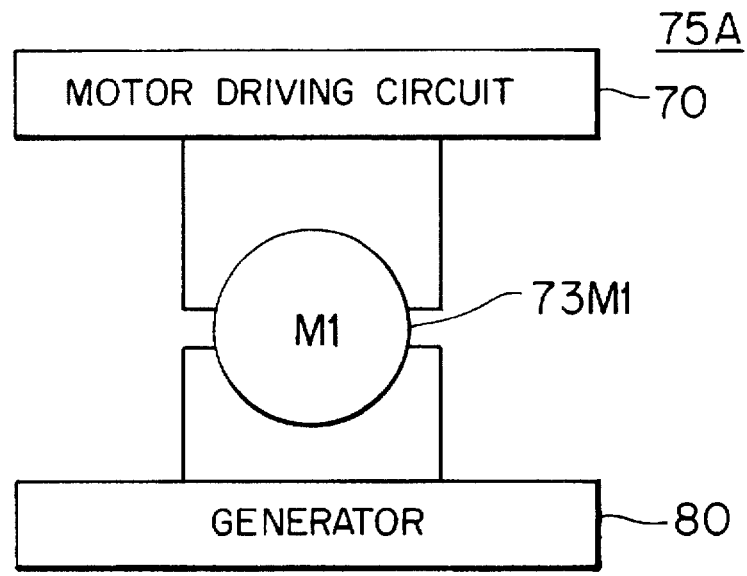
Figure 2B:
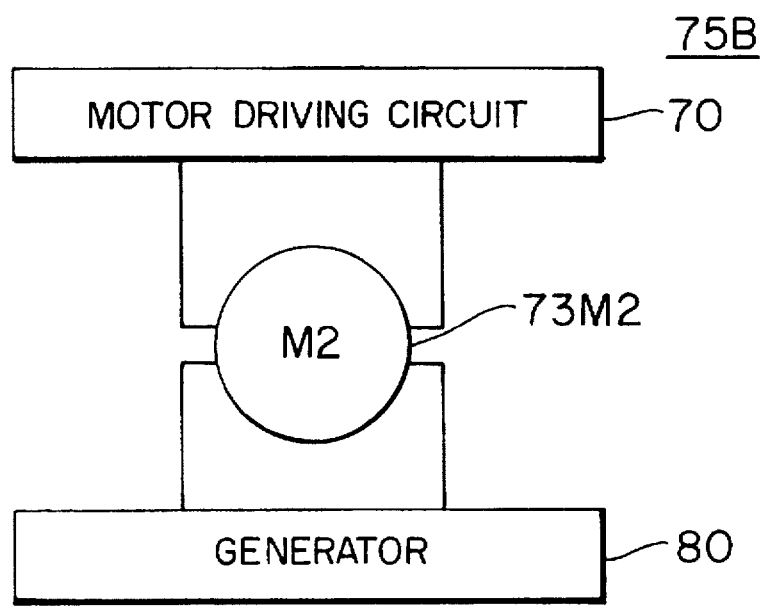

FIGS. 2A and 2B show the components of the first and second generating circuits, respectively. The first generating circuit comprises a motor driving circuit 70 connected to motor means 73, specifically motor 73M1. The motor driving circuit 70 turns the motor 73M1, which causes an electromagnetic coil to cut the magnetic flux in the generator 80. This generates a voltage at generator 80 that is used to charge the main condenser C1, FIG. 1, of strobe 50. Similarly, the second generating circuit comprises motor driving circuit 70 connected to a different motor of motor means 73, specifically motor 73M2. The turning of motor 73M2 causes an electromagnetic coil to cut the magnetic flux in generator 80, which generates a voltage. This voltage is used to charge the main condenser C1, FIG. 1 of strobe 50. A more detailed description of generator 80 is given below.

The strobe 50 in FIG. 2 is the same as the conventional strobe shown in FIG. 1.

Figure 6:
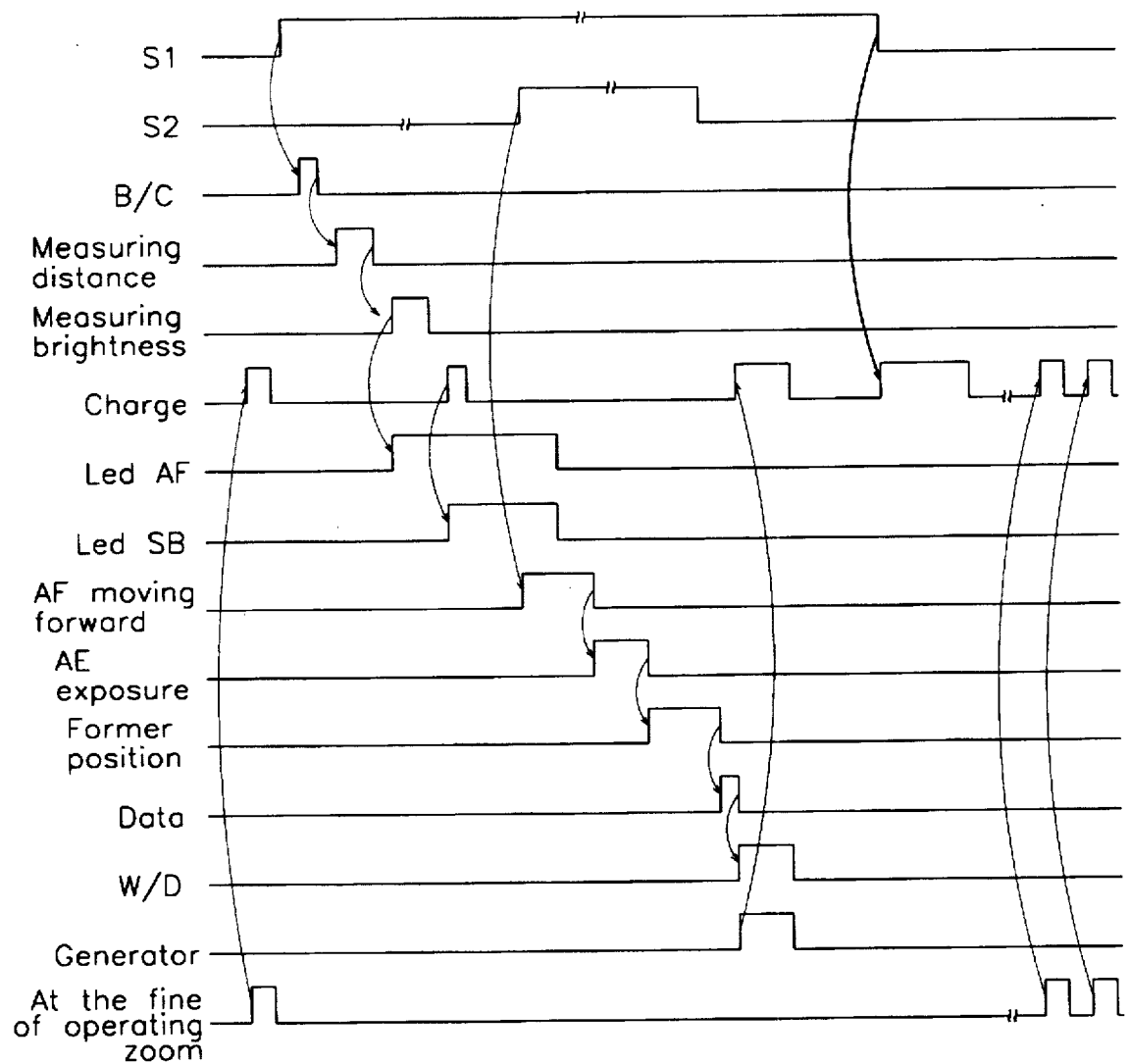
FIG. 6 is a timing diagram of the operation of a camera for shortening a strobe charge time in accordance with the first and second embodiments of the present invention.

The operation of a camera for shortening a strobe charge time in accordance with the first and second embodiments of the present invention is shown in FIG. 6.

The operation of the camera to shorten the strobe charge time in accordance with a first preferred embodiment of the present invention is described below with reference to FIGS. 3A and 3B.

Once power is turned ON, the microcontroller 30 initializes at S110 all circuits and variables used and determines at S120 whether film is mounted in the camera or not.

When a back cover of a camera is opened and film is mounted, the back cover switch S4 is turned ON. Thus, the microcontroller 30 determines at S120 whether the back-cover switch S4 is turned ON or not to determine if the film is mounted on the camera.

When the film is mounted, the microcontroller 30 determines at S130 if the power switch is turned ON or not, and in a case that the power switch is turned ON and the camera is ready to take a photograph, the microcontroller 30 determines at S150 if the present photographic mode is a flash mode.

In a case that the photographic mode switch S3 is turned ON and the selected mode is a flash mode, a charge signal is produced to the strobe 50 at S160. When a charge signal is produced from the microcontroller 30 to the strobe 50, the charge circuit 52 of the strobe 50 in FIG. 1, is activated to charge the main condenser C1. The microcontroller 30 charges the strobe 50 in response to the selection of the flash mode, and determines at S170 if the charge is finished. In a case that the charge is finished, the microcontroller 30 determines at S180 if the first step release switch S1 is turned ON.

If a picture-taker presses a release button (not shown) to take a photograph, the first step release switch S1 is turned ON, and an electrical signal corresponding to it is produced to the microcontroller 30 as shown in FIG. 6.

If the first step release switch S1 is turned ON, the microcontroller 30 senses a battery (not illustrated), and at 190 measures a distance from the camera to an object to be photographed, driving the automatic distance measuring circuit 20, and measures an ambient brightness around the object.

The microcontroller 30 determines at S200 if the second step release switch S2 is turned ON or not after the microcontroller 30 determines the amount of exposure, measures the distance from the object, and measures the brightness. If the second step release switch S2 is turned ON, the microcontroller 30 focuses on the object to be photographed according to the input distance information and carries out photographing at 210 by activating the shutter driving circuit 40 in response to the predetermined amount of exposure.

The microcontroller 30 then reads a predetermined variable, representing a predetermined number of cuts available for the film, and determines at S220 if photographs of over the predetermined number of cuts are taken. If photographs of over the predetermined number of cuts are not taken, the microcontroller 30 operates the motor driving circuit 70 at S230 to wind the film of the one cut that was photographed.

Figure 7A:
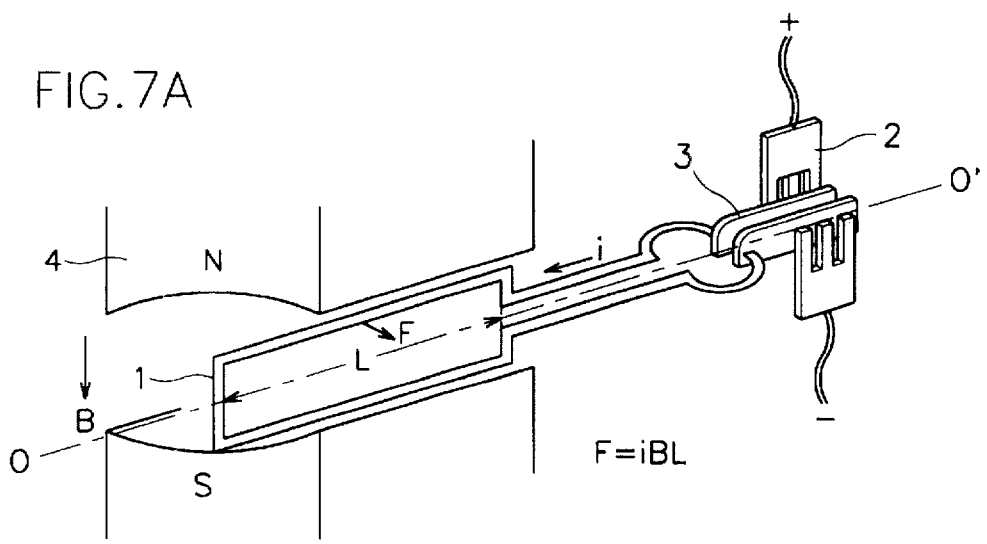
FIGS. 7A to 7C depict the operation of a generator in accordance with the first and second embodiments of the present invention.
Figure 7B:
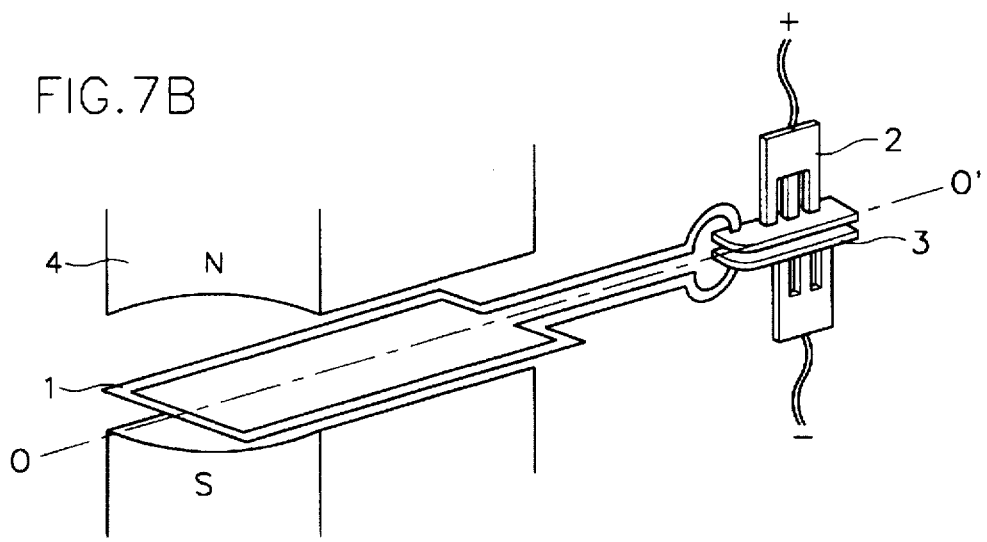
Figure 7C:
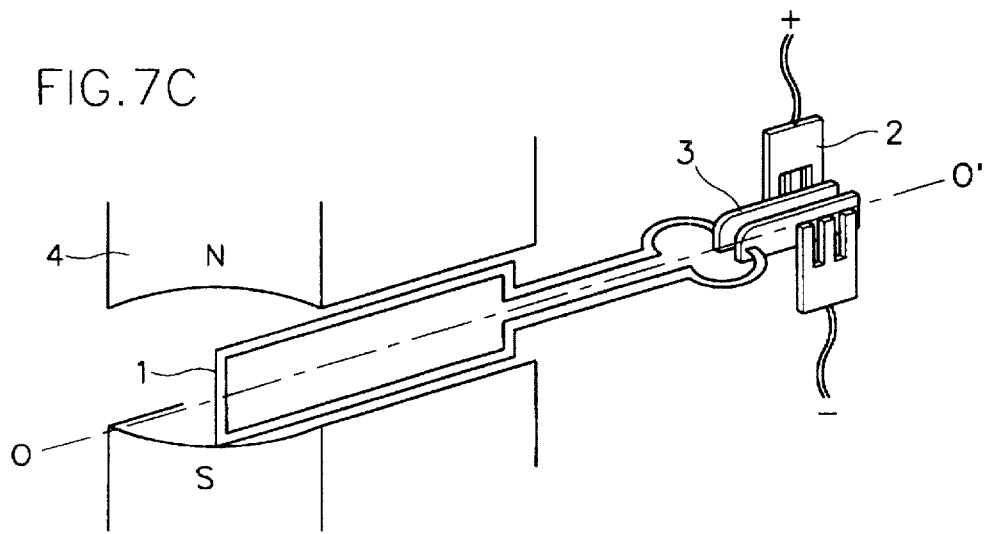

If the motor driving circuit 70 is activated to turn the film motor M1 clockwise, the turning effect of the film motor M1 is transferred to the generator 80. As shown in FIGS. 7A to 7C, the turning effect of the film motor M1 is transferred to an electromagnet coil 1 placed between the north and south poles N and S of an electromagnet 4 of the generator 80, the electromagnet coil 1 rotates around OO' axis. The rotation of the electromagnetic coil 1 cuts magnetic flux vertically to generate voltage by electromagnetic induction.

The direction of the generated voltage is determined by Flemming's right-hand rule, and the magnitude of the voltage is changed by the ratio of the cutting of magnetic flux vertically. Thus, the vertical cross-section of the coil 1 is gradually enlarged from FIG. 7A to FIG. 7B, and the voltage is maximum in the state of FIG. 7B. The voltage then becomes small as the state of FIG. 7C arrives, with the voltage in FIG. 7C being almost zero.

The voltage is produced between brushes 2 contacting a commutator 3. The AC voltage is rectified as a DC voltage, and is "connected across strobe 50" to charge the main condenser C1 at S230 to S250. The microcontroller 30 charges the strobe 50, winding the film motor M1, and determines if the power switch is operated or not. The microcontroller is then ready to take a photo.

When the film is not mounted at a first stage, the microcontroller determines at S140 if the film is mounted or not. In a case that the film is mounted in a camera, the microcontroller 30 operates the film motor M1 to transfer initially a three-comma of the film at S230. The generator 80 is driven by the operation of the film motor M1, and the voltage produced thereby charges the strobe 50 at S140 to S250.

In a case that the cuts of the film that were photographed are more than a predetermined number of cuts at 220, the microcontroller 30 operates the motor driving circuit 70 and rewinds the photographed film, reversely rotating the film motor M1 at S260 to S270.

FIG. 6 shows a timing diagram of the operation of a camera according to the first and second embodiments of the present invention.

FIGS. 4A and 4B depict the steps in the operation for controlling a zoom camera that may shorten a strobe charge time in accordance with a second preferred embodiment Of the present invention.

The following description is about the operation of the zoom camera for shortening a strobe charge time. The initial operation of the second preferred embodiment (S300 to S350) is similar to that of the first preferred embodiment (S100 to S150).

Like the first preferred embodiment, the microcontroller is in a flash mode to charge the strobe 50, and determines at S370 if the zooming switch S5 is turned ON or turned OFF.

If a picture-taker operates the zooming switch S5 to select a direction of the zooming operation in a telephoto position or in a wide angle positions the microcontroller 30 operates the motor driving circuit 70 that drives the zooming motor M2 to carry out the zooming operation at S380.

As the zooming motor M2 is driven, the produced turning effect is input to the generator 80 to operate the generator 80 as in the first preferred embodiment. The voltage produced by the operation of the generator 80 is applied to the strobe 50 to charge the main condenser C1 at S390 to S400.

After the zooming operation by the zooming switch S5, the microcontroller 30 determines at S400 if the charging of the strobe 50 is completed or not.

In a case that the charging of the strobe 50 is not completed by the operation of the zooming motor M2, the microcontroller determines the operating state of the zooming motor M2 at S410. In a case that the zooming operation is finished and the zooming motor M2 is stopped, the microcontroller 30 operates the charge circuit 52 of the strobe 50 to charge the main condenser C1 with the battery voltage of the strobe 50.

When the zooming motor M2 is being operated, the microcontroller 30 operates the motor driving circuit 70 to carry out the charge operation of the strobe 50 by the generator 80. If charging the strobe 50 is finished, the microcontroller carries out a photographing operation by the release switches S1 and S2 (S410 to S460 steps) in a manner similar to that used in the first preferred embodiment. The microcontroller determines the number of the film cuts, and if all the mounted film is not used for the photographing operation, the microcontroller drives the film motor M1 to wind the photographed film at S470 to S480.

The generator 80 is driven by the operation of the film motor M1, and the voltage produced thereby charges the strobe 50 again. If all the mounted film is used for the photographing operation, the film is rewound thereby finishing the operation.

In order to generate electrical energy using more than one motor in a camera of the present invention, a generator is mounted around or inside each motor to apply the electrical energy produced by the turning effect of the motor to the strobe.

Further, according to the present invention, after the strobe flashes to carry out a photographing operation, the strobe is again charged by the operation of the film motor and zooming motor. Thus, if the photographing operation is carried out again, the present invention may take a picture of a desired moment promptly and with a suitable amount of exposure by shortening the strobe charge time.

Although only preferred embodiments and select modifications of the invention have been disclosed and described, it is apparent that other embodiments and modifications of the invention are possible with the scope of the appended claims.

What is claimed is:

1. Flash apparatus for a camera comprising:

a strobe for producing illuminating light;

a microcontroller operatively coupled to the strobe, for analyzing a charge condition of the strobe;

an electrical motor controlling the winding of film mounted in the camera;

a generating circuit, operatively coupled to said motor, for generating electrical energy whenever said motor is energized and for charging said strobe with the generated electrical energy; and a charge circuit, including a battery, for charging the strobe with electrical energy stored in the battery until the microprocessor determines that the charging of the strobe is finished.

2. Flash apparatus for a camera comprising:

a strobe for producing illuminating light;

a microcontroller operatively coupled to the strobe, for analyzing a charge condition of the strobe;

a first motor for controlling the winding of a film mounted in the camera;

a second motor for controlling the movement of a lens system in the camera;

a first generating circuit, operatively coupled to said first motor, for generating electrical energy whenever said first motor is energized;

a second generating circuit, operatively coupled to said second motor, for generating electrical energy whenever said second motor is energized; and a charge circuit, including a battery, for charging the strobe with electrical energy stored in the battery; wherein the electrical energy generated by either one of said first and second generating circuits is used to charge said strobe when said microcontroller determines the strobe needs to be charged.

3. Flash apparatus for a camera comprising:

a strobe for producing illuminating light;

a microcontroller operatively coupled to the strobe, for analyzing a charge condition of the strobe;

a first motor for controlling the winding of a film mounted in the camera;

a second motor for controlling the movement of a lens system in the camera;

a first generating circuit, operatively coupled to said first motor, for generating electrical energy whenever said first motor is energized;

a second generating circuit, operatively coupled to said second motor, for generating electrical energy whenever said second motor is energized; and a charge circuit, including a battery, for charging the strobe with electrical energy stored in the battery; wherein the electrical energy generated by both of said first and second generating circuits is used to charge said strobe when said microcontroller determines the strobe needs to be charged.

4. The camera for shortening a strobe charge time of claim 1, wherein said electrical motor includes a motor for controlling the movement of a lens system in the camera.

* * * * *